(12) United States Patent
Ahn et al.

(10) Patent No.: US 9,324,991 B2
(45) Date of Patent: Apr. 26, 2016

(54) HIGH VOLTAGE BATTERY FOR VEHICLES

(71) Applicant: Hyundai Motor Company, Seoul (KR)

(72) Inventors: Seung Ho Ahn, Seoul (KR); Sung Min Choi, Gyeongju-si (KR); Hong Seok Min, Yongin-Si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 96 days.

(21) Appl. No.: 14/333,147

(22) Filed: Jul. 16, 2014

(65) Prior Publication Data

US 2015/0180015 A1 Jun. 25, 2015

(30) Foreign Application Priority Data

Dec. 19, 2013 (KR) .......................... 10-2013-0159575

(51) Int. Cl.
*H01M 2/34* (2006.01)
*H01M 2/02* (2006.01)
*H01M 2/30* (2006.01)

(52) U.S. Cl.
CPC ............ *H01M 2/345* (2013.01); *H01M 2/0217* (2013.01); *H01M 2/305* (2013.01); *H01M 2200/20* (2013.01); *H01M 2220/20* (2013.01)

(58) Field of Classification Search
CPC . H01M 2/345; H01M 2220/20; H01M 2/305; H01M 2/0217; H01M 2200/20
See application file for complete search history.

(56) References Cited

U.S. PATENT DOCUMENTS

| | | | | |
|---|---|---|---|---|
| 2005/0014036 A1* | 1/2005 | Kim | ...................... | H01M 2/021 429/7 |
| 2006/0093896 A1* | 5/2006 | Hong | ...................... | H01M 2/34 429/61 |
| 2006/0267545 A1* | 11/2006 | Lee | ...................... | H01M 2/1061 320/106 |
| 2008/0241671 A1* | 10/2008 | Cherng | .................. | H01M 2/021 429/163 |
| 2011/0104520 A1* | 5/2011 | Ahn | ........................ | H01M 2/22 429/7 |
| 2014/0050950 A1* | 2/2014 | Kim | ........................ | H01M 2/34 429/61 |
| 2015/0044543 A1* | 2/2015 | Yoon | ..................... | H01M 2/204 429/158 |
| 2015/0072189 A1* | 3/2015 | Guen | ...................... | H01M 2/34 429/61 |
| 2015/0171412 A1* | 6/2015 | Matsumoto | ........... | H01M 2/263 429/7 |

FOREIGN PATENT DOCUMENTS

JP 2001-185124 A 7/2001
JP 2004-327047 A 11/2004

(Continued)

OTHER PUBLICATIONS

Korean Notice of Allowance issued in Korean Application No. 10-2013-0159575 dated Sep. 25, 2015.

*Primary Examiner* — Muhammad Siddiquee
(74) *Attorney, Agent, or Firm* — McDermott Will & Emery LLP

(57) ABSTRACT

A high voltage battery for vehicles includes an electrode tab that is divided into a first part placed near a battery cell, and a second part placed near a terminal. A first part extension extends from the first part and is fixed to a lower pouch. A second part extension extends from the second part, comes into contact with the first part extension, has elasticity, and is fixed at an upper end thereof to an upper pouch. A hook part extends from the first part extension and holds the second part extension by grasping an edge of the second part extension.

8 Claims, 3 Drawing Sheets

(56) References Cited

FOREIGN PATENT DOCUMENTS

| JP | 2012-181977 A | 9/2012 |
|---|---|---|
| KR | 10-0271238 B1 | 2/1998 |
| KR | 10-2005-0107681 A | 11/2005 |
| KR | 10-0874402 B1 | 12/2008 |
| KR | 10-2011-0048470 A | 5/2011 |
| KR | 10-2013-0014250 A | 2/2013 |
| KR | 10-2013-0014253 A | 2/2013 |
| KR | 10-1264534 B1 | 5/2013 |

* cited by examiner

HIGH VOLTAGE BATTERY FOR VEHICLES

CROSS-REFERENCE(S) TO RELATED APPLICATION

The present application claims the benefit of priority of Korean Patent Application Number 10-2013-0159575 filed on Dec. 19, 2013, the entire contents of which is incorporated herein for all purposes by this reference.

TECHNICAL FIELD

The present disclosure relates, in general, to a high voltage battery for vehicles which can realize safety of a pouch cell using a pouch type current interruptive device (CID), thereby improving marketability of batteries for the vehicles.

BACKGROUND

As the application of a pouch type lithium ion secondary battery has spread in recent years, the energy density of batteries and the energy storage capacity of a unit cell have gradually increased. Particularly, to meet requirements brought from an increase in the mileage of a vehicle, it has been actively studied in recent years to find a technology that can increase the energy storage capacity of a lithium ion secondary battery for vehicles. However, the conventional pouch type lithium ion secondary battery is problematic in that the sheath of the battery has a low physical strength, and the battery is not provided with a cell level safety device (current interruptive device (CID), Positive Temperature Coefficient (PTC), fuse, etc.). Therefore, it is difficult to realize desired safety of a battery having a high energy storage capacity. Particularly, when a vehicle battery is overcharged, gas is generated in the battery, and the temperature inside the battery increases, so thermal runaway may be induced in the material inside the battery and may result in a fire. Further, when an abnormal reaction is generated in even just one unit cell when driving the vehicle, an abnormal voltage may be easily induced in a battery pack, thereby reducing the driving safety of the vehicle.

The foregoing is intended merely to aid in the understanding of the background of the present disclosure, and is not intended to mean that the present disclosure falls within the purview of the related art that is already known to those skilled in the art.

SUMMARY

The present disclosure is intended to propose a high voltage battery for vehicles, which can realize safety of a pouch cell using a pouch type (current interruptive device (CID), used as an overcharge safety device), thereby improving marketability of batteries for the vehicles.

According to an exemplary embodiment of the present disclosure, a high voltage battery for vehicles includes an electrode tab that is divided into a first part placed near a battery cell and a second part placed near a terminal. A first part extension extends from the first part and is fixed to a lower pouch. A second part extension extends from the second part, comes into contact with the first part extension, has elasticity, and is fixed at an upper end thereof to an upper pouch. A hook part extends from the first part extension and holds the second part extension by grasping an edge of the second part extension.

The space between the upper pouch and the lower pouch may be vacuumized.

When the battery cell is expanded, the space between the upper pouch and the lower pouch may expand, and the second part extension may be elastically deformed and may escape from the hook part.

The high voltage battery for vehicles may further include: a housing in which the first part extension is held and which is open upward through an opening, with the hook part formed by an edge of the opening.

The second part extension may be held in the housing and may come into contact with the first part extension.

The second part extension may be configured to have a diameter larger than a diameter of the opening of the housing, so, once the second part extension escapes from the housing, the second part extension may not be inserted into the housing.

A plurality of elastic legs may extend downward from the second part extension in radial directions, and may come into contact with the first part extension.

According to another exemplary embodiment of the present disclosure, a high voltage battery for vehicles includes an electrode tab that is divided into a first part placed near a terminal and a second part placed near a battery cell. A first part extension extends from the first part and is fixed to a lower pouch. A second part extension extends from the second part, comes into contact with the first part extension, has elasticity, and is fixed at an upper end thereof to an upper pouch. A hook part extends from the first part extension and holds the second part extension by grasping an edge of the second part extension.

The high voltage battery for vehicles which has the above-mentioned construction is advantageous in that, when the volume of a battery cell is abnormally expanded and a variation in the pressure inside the cell is induced, the circuit of the battery is physically opened at a pressure equal to or higher than a predetermined level, thereby interrupting an external electric current and inducing cut-off of the circuit, so the present disclosure can realize cell level safety and pack voltage safety.

Unlike the conventional pouch type battery, in which, to avoid overcharge, a safety device designed to be limitedly used in the unit of module or package pack is used, the present disclosure provides an overcharge safety device that can realize cell level safety in a unit cell, and can interrupt an abnormal cell reaction in unit cells.

Further, the present disclosure adds an overcharge safety device in a surplus space between a jelly roll and a lead tab inside a pouch type unit cell, thereby realizing cell level safety regardless of module type batteries or pack package type batteries.

BRIEF DESCRIPTION OF THE DRAWINGS

The above and other objects, features and other advantages of the present disclosure will be more clearly understood from the following detailed description when taken in conjunction with the accompanying drawings.

DETAILED DESCRIPTION

Hereinbelow, an exemplary embodiment of the present disclosure will be described in detail with reference to the accompanying drawings.

Figure 1:
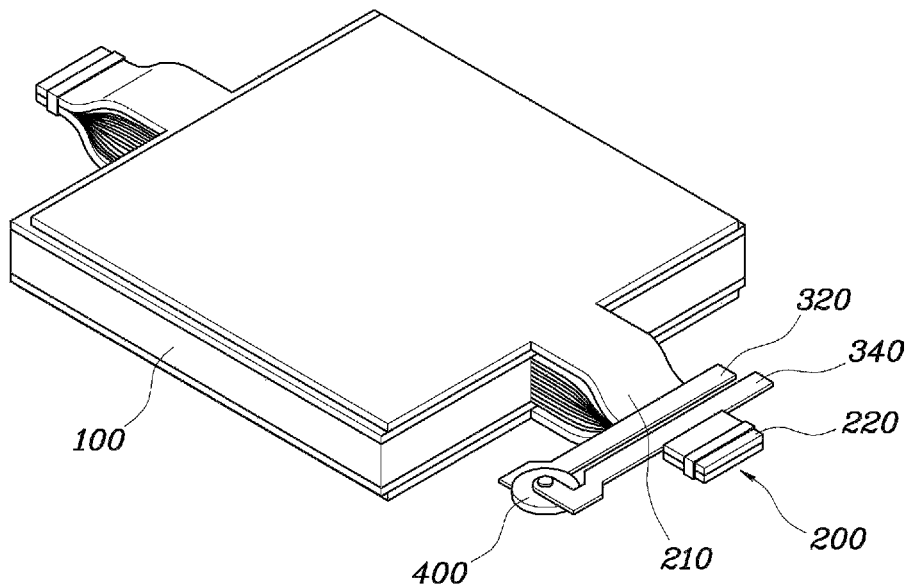
FIG. 1 is a perspective view illustrating a high voltage battery for vehicles according to an embodiment of the present disclosure.
Figure 2:
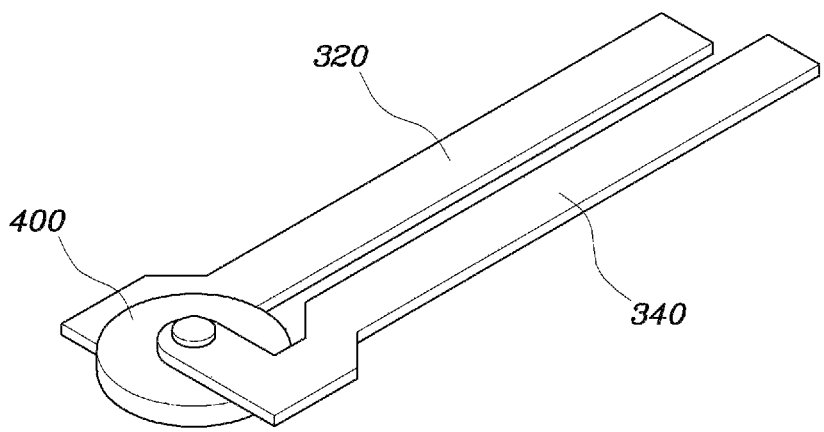
FIG. 2 is a perspective view illustrating a current interruptive device (CID) of a high voltage battery for vehicles according to an embodiment of the present disclosure.
Figure 3:
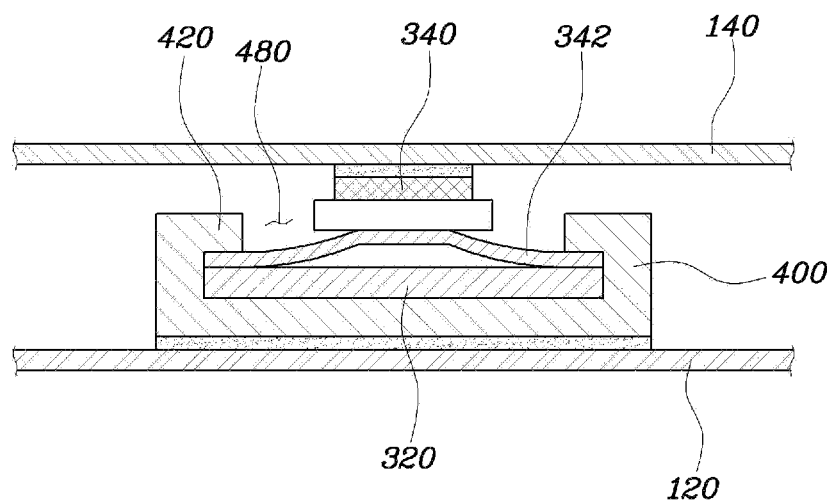
FIGS. 3 and 5 are sectional views illustrating an operation of a high voltage battery for vehicles according to an embodiment of the present disclosure.
Figure 4:
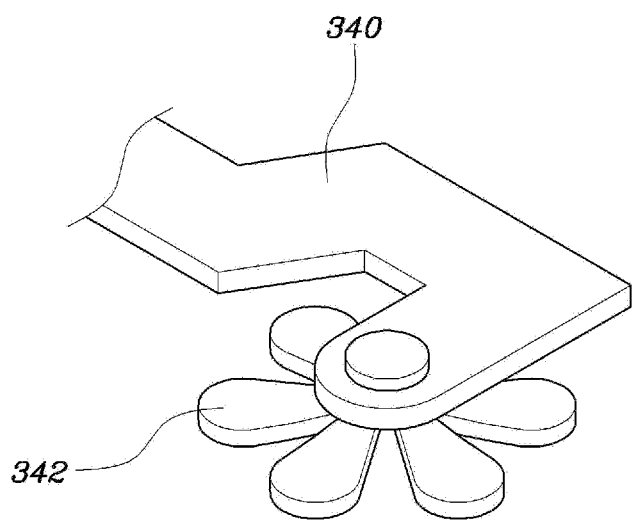
FIG. 4 is a perspective view illustrating a second part extension of a high voltage battery for vehicles according to an embodiment of the present disclosure.
Figure 5:
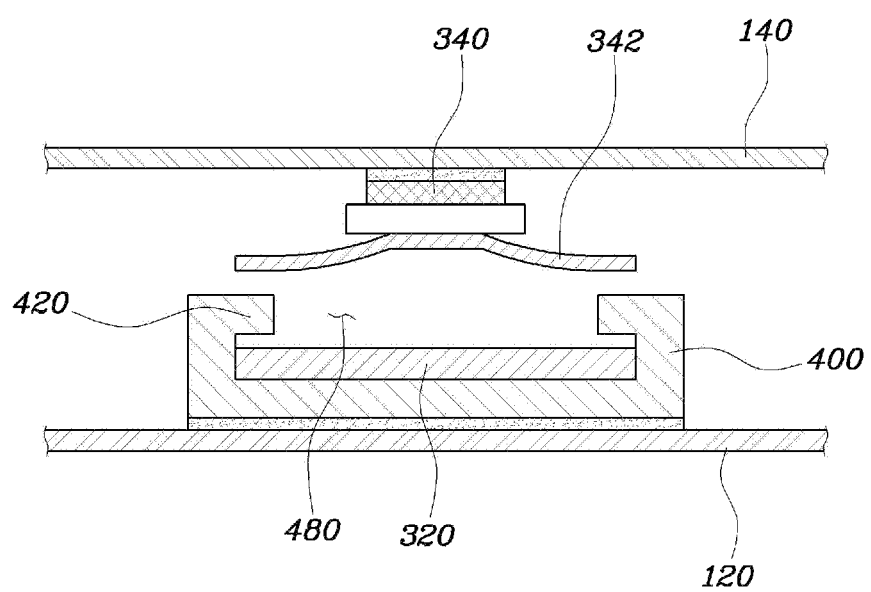

FIG. 1 is a view illustrating a high voltage battery for vehicles according to an embodiment of the present disclosure. FIG. 2 is a view illustrating a CID used as an overcharge safety device of a high voltage battery for vehicles according to an embodiment of the present disclosure. FIGS. 3 to 5 are views illustrating an operation of a high voltage battery for vehicles according to an embodiment of the present disclosure.

The present disclosure is provided so as to realize both the cell level safety of a pouch cell and the driving safety of a vehicle. The high voltage battery for vehicles according to the present disclosure includes an electrode tab 200 that is divided into a first part 210 placed near a battery cell and a second part 220 placed near a terminal (not shown). A first part extension 320 extends from the first part 210 and is fixed to a lower pouch 120. A second part extension 340 extends from the second part 220, comes into contact with the first part extension 320, has elasticity, and is fixed at an upper end thereof to an upper pouch 140. A hook part 420 extends from the first part extension 320 and holds the second part extension 340 by grasping an edge of the second part extension 340.

As shown in FIG. 1, the electrode tab 200 of the present disclosure is divided into the first part 210 that is placed near the battery cell and the second part 220 that is placed near the terminal. In a normal state, the first part 210 and the second part 220 are brought into contact with each other by a CID, so the battery can perform normal functions. However, when the battery cell 100 is expanded, the first part 210 and the second part 220 are separated from each other. The battery cell 100 of FIG. 1 is packaged in a pouch including an upper pouch 140 and a lower pouch 120, in which a space between the upper pouch 140 and the lower pouch 120 is vacuumized.

As shown in FIGS. 2 and 3, the first part extension 320 extends from the first part 210 and is fixed to the lower pouch 120 using a bonding agent. The second part extension 340 extends from the second part 220 and comes into contact with the first part extension 320, and has the elasticity. Here, the second part extension 340 is fixed at the upper end thereof to the upper pouch 140 using the bonding agent. Further, the hook part 420 extends from the first part extension 320 and holds the second part extension 340 by grasping the edge of the second part extension 340, so that in a normal state, the first part extension 320 and the second part extension 340 are maintained in a contact position relative to each other, and the battery can perform the normal functions.

However, when the battery cell 100 is expanded, the space between the upper pouch 140 and the lower pouch 120 expands as shown in FIG. 5, so the second part extension 340 is elastically deformed and can escape from the hook part 420.

A housing 400 is provided. The housing 400 firmly holds the first part extension 320 therein, and an upper portion of the housing 400 is opened through an opening 480. Here, the hook part 420 is formed by an edge of the opening 480. Accordingly, the second part extension 340 is normally maintained in an original assembly state, in which the second part extension 340 is held in the housing 400 and comes into contact with the first part extension 320. Here, as shown in FIG. 5, the second part extension 340 is configured to have a diameter larger than the diameter of the opening 480 of the housing 400, so that once the second part extension 340 escapes from the housing 400, the second part extension 340 may not be inserted into the housing 400.

Further, as shown in FIG. 4, a plurality of elastic legs 342 extend downward from the second part extension 340 in radial directions, so that the legs 342 of the second part extension 340 may come into contact with the first part extension 320. Described in detail, the housing 400 is placed between the upper pouch 140 and the lower pouch 120. Here, the lower surface of the housing 400 is bonded to the inside surface of the lower pouch 120. The first part extension 320 is fixed in the housing 400, and the second part extension 340 is inserted into the housing 400 through the opening 480 of the housing 400, such that the second part extension 340 can be maintained in a contact position relative to the first part extension 320 in a normal state. However, when the battery cell 100 expands, the upper pouch 140 and the lower pouch 120 are pressurized in an opposite direction by expanding force, so that the elastic legs 342 of the second part extension 340 elastically escape from the housing 400, and the electric contact of the battery cell 100 is interrupted. Once the electric contact of the battery cell 100 is interrupted, the legs 342 of the second part extension 340 cannot be inserted into the housing 400, thereby realizing the safety of the battery.

In the present disclosure, locations of the first part 210 and the second part 220 may be changed with each other. Described in detail, in another embodiment of the present disclosure, the high voltage battery for vehicles may include an electrode tab that is divided into a first part placed near a terminal and a second part placed near a battery cell. A first part extension extends from the first part and is fixed to a lower pouch. A second part extension extends from the second part, comes into contact with the first part extension, has elasticity, and is fixed at an upper end thereof to an upper pouch. A hook part extends from the first part extension and holds the second part extension by grasping an edge of the second part extension.

The high voltage battery for vehicles which has the above-mentioned construction has advantages. When the volume of a battery cell is abnormally expanded, and a variation in the pressure inside the cell is induced, a circuit of the battery is physically opened at a pressure equal to or higher than a reference level, thereby interrupting an external electric current and inducing cut-off of the circuit, so the present disclosure can realize cell level safety and pack voltage safety.

Unlike the conventional pouch type battery, in which, to avoid overcharge, a safety device designed to be limitedly used in a unit of module or package pack is used, the present disclosure provides an overcharge safety device that can realize cell level safety in a unit cell and can interrupt an abnormal cell reaction in unit cells.

Further, the present disclosure adds an overcharge safety device in a surplus space between a jelly roll and a lead tab inside a pouch type unit cell, thereby realizing cell level safety regardless of module type batteries or pack package type batteries.

Although an exemplary embodiment of the present disclosure has been described for illustrative purposes, those skilled in the art will appreciate that various modifications, additions and substitutions are possible, without departing from the scope and spirit of the disclosure as disclosed in the accompanying claims.

What is claimed is:

1. A high voltage battery for vehicles, comprising:
   an electrode tab that is divided into a first part placed near a battery cell and a second part placed near a terminal;
   a first part extension that extends from the first part and is fixed to a lower pouch;
   a second part extension that extends from the second part, comes into contact with the first part extension, has elasticity, and is fixed at an upper end thereof to an upper pouch; and
   a hook part that extends from the first part extension and holds the second part extension by grasping an edge of the second part extension.

2. The high voltage battery for vehicles as set forth in claim 1, wherein a space between the upper pouch and the lower pouch is vacuumized.

3. The high voltage battery for vehicles as set forth in claim 1, wherein when the battery cell is expanded, a space between the upper pouch and the lower pouch expands, and the second part extension is elastically deformed and escapes from the hook part.

4. The high voltage battery for vehicles as set forth in claim 1, further comprising:
   a housing in which the first part extension is held, and an upper portion thereof being opened through an opening, with the hook part formed by an edge of the opening.

5. The high voltage battery for vehicles as set forth in claim 4, wherein the second part extension is held in the housing and comes into contact with the first part extension.

6. The high voltage battery for vehicles as set forth in claim 4, wherein the second part extension is configured to have a diameter larger than a diameter of the opening of the housing so that once the second part extension escapes from the housing, the second part extension cannot be inserted into the housing.

7. The high voltage battery for vehicles as set forth in claim 1, wherein a plurality of elastic legs extend downward from the second part extension in radial directions, and come into contact with the first part extension.

8. A high voltage battery for vehicles, comprising:
   an electrode tab that is divided into a first part placed near a terminal and a second part placed near a battery cell;
   a first part extension that extends from the first part and is fixed to a lower pouch;
   a second part extension that extends from the second part, comes into contact with the first part extension, has elasticity, and is fixed at an upper end thereof to an upper pouch; and
   a hook part that extends from the first part extension and holds the second part extension by grasping an edge of the second part extension.

* * * * *